United States Patent
Zhu et al.

(10) Patent No.: US 11,556,425 B2
(45) Date of Patent: Jan. 17, 2023

(54) FAILOVER MANAGEMENT FOR BATCH JOBS

(71) Applicant: International Business Machines Corporation, Armonk, NY (US)

(72) Inventors: Bo Chen Zhu, Xi'an (CN); Xiao Mou Zhang, Beijing (CN); Hui R Ruan, Beijing (CN); Jing Wang, Beijing (CN); Yuan Jie Zhang, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/232,210

(22) Filed: Apr. 16, 2021

(65) Prior Publication Data

US 2022/0334933 A1 Oct. 20, 2022

(51) Int. Cl.
*G06F 11/14* (2006.01)
*G06F 9/48* (2006.01)

(52) U.S. Cl.
CPC ........ *G06F 11/1438* (2013.01); *G06F 9/4881* (2013.01); *G06F 11/1479* (2013.01); *G06F 2201/805* (2013.01)

(58) Field of Classification Search
CPC .. G06F 11/008; G06F 11/0751; G06F 11/079; G06F 11/1438; G06F 11/1461;
(Continued)

(56) References Cited

U.S. PATENT DOCUMENTS 5,321,835 A * 6/1994 Tanaka ...................... G06F 8/71
714/48
8,533,718 B2 9/2013 Yamaguchi
(Continued)

FOREIGN PATENT DOCUMENTS

CN 111949832 A * 11/2020
KR 1020070018521 A 2/2007

OTHER PUBLICATIONS

"Normalization failover for scheduled batch jobs", BCM, Documentation for BMC Atrium Core 9.1.04—BMC Documentation, downloaded from the Internet on Nov. 12, 2020, 5 pages, <https://docs.bmc.com/docs/ac9104/normalization-failover-for-scheduled-batch-jobs-775455445.html>.
(Continued)

*Primary Examiner* — Bryce P Bonzo
*Assistant Examiner* — Albert Li
(74) *Attorney, Agent, or Firm* — Randy Tejeda (57) ABSTRACT

Computer-implemented methods, computer program products, and computer systems are provided. A method includes generating a running result matrix for a plurality of batch jobs, indicating corresponding running results for respective processing actions in batch jobs of the plurality of batch jobs. The method further includes obtaining an internal dependency matrix for the plurality of batch jobs, indicating corresponding dependencies between respective processing actions within a batch job of the plurality of batch jobs. The method further includes calculating a recovery matrix for the plurality of batch jobs based, at least in part, on the running result matrix and the internal dependency matrix, the recovery matrix indicating corresponding recovery actions for respective processing actions in batch jobs of the plurality of batch jobs. The method further includes executing failover management for one or more batch jobs based, at least in part, on the calculated recovery matrix.

15 Claims, 6 Drawing Sheets

(58) Field of Classification Search
CPC ............ G06F 11/1474; G06F 11/1479; G06F 11/1482; G06F 9/4843; G06F 9/485; G06F 9/4881; G06F 2201/805
See application file for complete search history.

(56) References Cited

U.S. PATENT DOCUMENTS

| | | | |
|---|---|---|---|
| 8,806,490 B1* | 8/2014 | Pulsipher | G06Q 10/10 718/100 |
| 9,098,455 B2 | 8/2015 | Atluri | |
| 9,389,892 B2 | 7/2016 | Ben Or | |
| 2007/0277174 A1* | 11/2007 | Cai | G06F 9/5038 718/101 |
| 2010/0169592 A1 | 7/2010 | Atluri | |
| 2012/0210323 A1* | 8/2012 | Hosouchi | G06F 9/5038 718/102 |
| 2012/0284557 A1 | 11/2012 | Shen | |
| 2018/0217901 A1* | 8/2018 | Fujii | G06F 11/1461 |

OTHER PUBLICATIONS

Mell et al., "The NIST Definition of Cloud Computing", Recommendations of the National Institute of Standards and Technology, Special Publication 800-145, Sep. 2011, 7 pages.
White et al., "Getting Started with IBM Z Resiliency", IBM, Redbooks, First Edition Mar. 2020, 166 pages.

* cited by examiner

FAILOVER MANAGEMENT FOR BATCH JOBS

BACKGROUND

The present application relates generally to batch job processing, and more specifically to failover management for batch jobs.

A batch job, in the simplest terms, is a scheduled program that is assigned to run on a computer system with little or no further user interactions. Batch jobs are often queued up during working hours and then executed during the evening or weekend when the computer system is idle. Once a batch job is submitted, the job enters into a queue where it waits until the system is ready to process the job. If the job queue contains many jobs waiting to be processed, the system processes the jobs either in chronological order or by priority. Batch jobs are frequently used to automate tasks that need to be performed on a regular basis. A batch job comprises a plurality of processing actions each of which is an independent and a sequential phase of the batch job such as a step of the batch job and the like. In addition to processing actions, a batch job may also contain one or more decision actions which utilize the exit status of the previous processing action to determine the next processing action or terminate the batch job altogether. Decision actions set the status of the batch job when terminating it, noting if it was terminated successfully, it was interrupted, or it failed. Batch jobs are widely used in cloud computing environments.

Failover, in computing and related technologies, is switching to a redundant or standby computer system, server, hardware component, or network upon a failure or abnormal termination of the previously active application, system, server, hardware component, or network. Failover is automatic and usually operates without warning. Batch job failover management is the management of failover upon a failure or abnormal termination of batch jobs.

SUMMARY

The following presents a summary to provide a basic understanding of one or more embodiments of the disclosure. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products for data recovery are described.

One example embodiment provides a computer-implemented method. The computer-implemented method includes generating, by one or more processors, a running result matrix for a plurality of batch jobs, the running result matrix indicating corresponding running results for respective processing actions in batch jobs of the plurality of batch jobs. The computer-implemented method further includes obtaining, by one or more processors, an internal dependency matrix for the plurality of batch jobs, the internal dependency matrix indicating corresponding dependencies between respective processing actions within a batch job of the plurality of batch jobs. The computer-implemented method further includes calculating, by one or more processors, a recovery matrix for the plurality of batch jobs based, at least in part, on the running result matrix and the internal dependency matrix, the recovery matrix indicating corresponding recovery actions for respective processing actions in batch jobs of the plurality of batch jobs. The computer-implemented method further includes advantageously executing, by one or more processors, failover management for one or more batch jobs of the plurality of batch jobs based, at least in part, on the calculated recovery matrix.

Another example embodiment provides a computer program product. The computer program product includes one or more computer readable storage media and program instructions collectively stored on the one or more computer readable storage media. The program instructions are executable by one or more processors to cause the one or more processors to perform the computer-implemented method described above.

Another example embodiment provides a computer system. The computer system includes one or more processors and one or more computer readable storage media. The one or more processors are structured, located, connected and/or programmed to execute program instructions collectively stored on the one or more computer readable storage media. The program instructions, when executed by the one or more processors, cause the one or more processors to perform the computer-implemented method described above.

In another example embodiment, the recovery matrix described above includes an internal recovery matrix and an external recovery matrix. The internal recovery matrix is advantageously calculated based, at least in part, on the running result matrix and the internal dependency matrix. The external recovery matrix is advantageously calculated based, at least in part, on a trigger dependency matrix and the internal recovery matrix, where the trigger dependency matrix indicates corresponding dependencies between respective processing actions in batch jobs of the plurality of batch jobs and other batch jobs in the plurality of batch jobs.

In another example embodiment, the generating of the running result matrix advantageously includes obtaining a verification matrix for the plurality of batch jobs, the verification matrix indicating corresponding processing actions in batch jobs of the plurality of batch jobs; obtaining an execution matrix for the plurality of batch jobs, the execution matrix indicating corresponding execution statuses for respective processing actions in batch jobs of the plurality of batch jobs; and generating the running result matrix by performing a subtraction operation involving the verification matrix and the execution matrix.

These and other features and advantages will be described in, or will become apparent to, those of ordinary skill in the art in view of the following detailed description of the example embodiments of the present disclosure.

BRIEF DESCRIPTION OF THE DRAWINGS

The following detailed description, given by way of example and not intended to limit the disclosure solely thereto, will best be appreciated in conjunction with the accompanying drawings, in which.

The drawings are not necessarily to scale. The drawings are merely schematic representations, not intended to portray specific parameters of the disclosure. The drawings are intended to depict only typical embodiments of the disclosure. In the drawings, like numbering represents like elements.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Embodiments of the present disclosure may be implemented with, however are not limited to, a cloud computing environment which will be described in the following.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
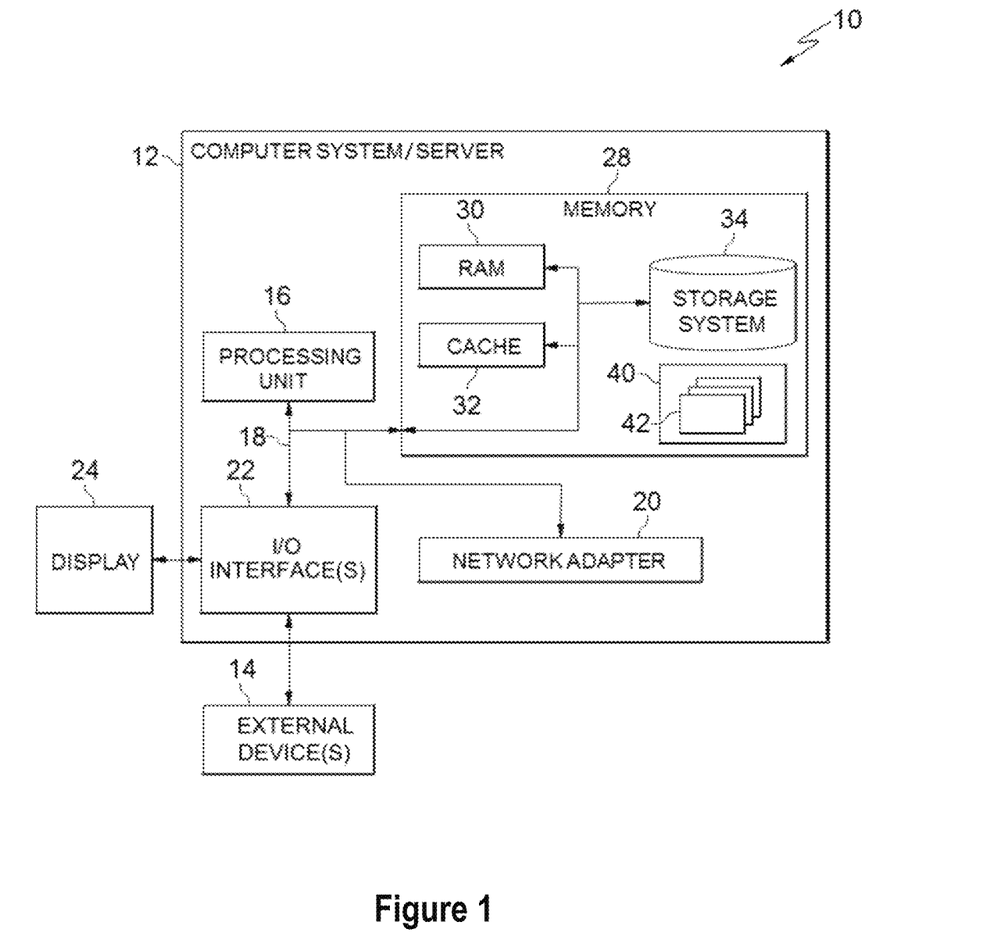
FIG. 1 depicts a cloud computing node according to some embodiments of the present disclosure.

Referring now to FIG. 1, a schematic of an example of a cloud computing node is shown, according to an embodiment of the present disclosure. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general-purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
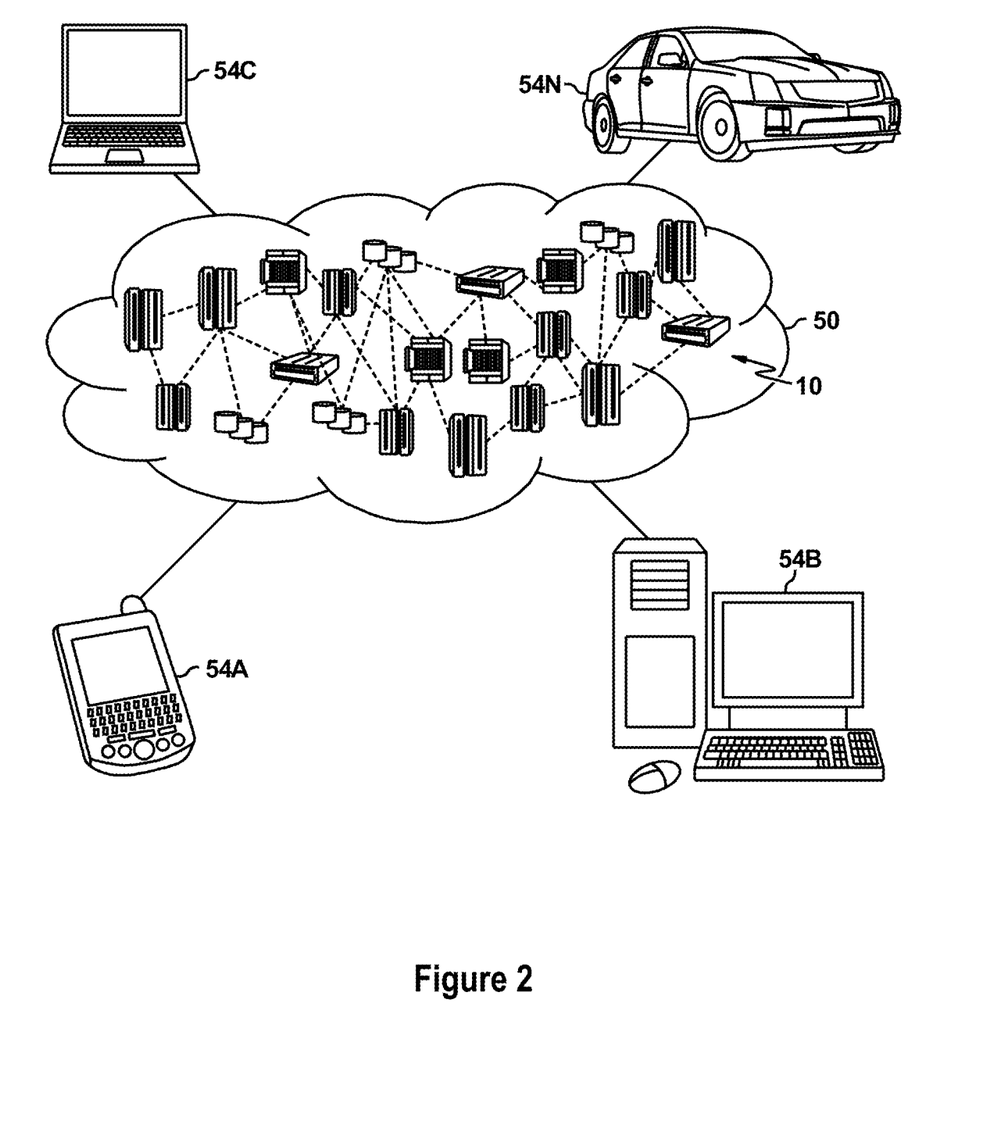
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
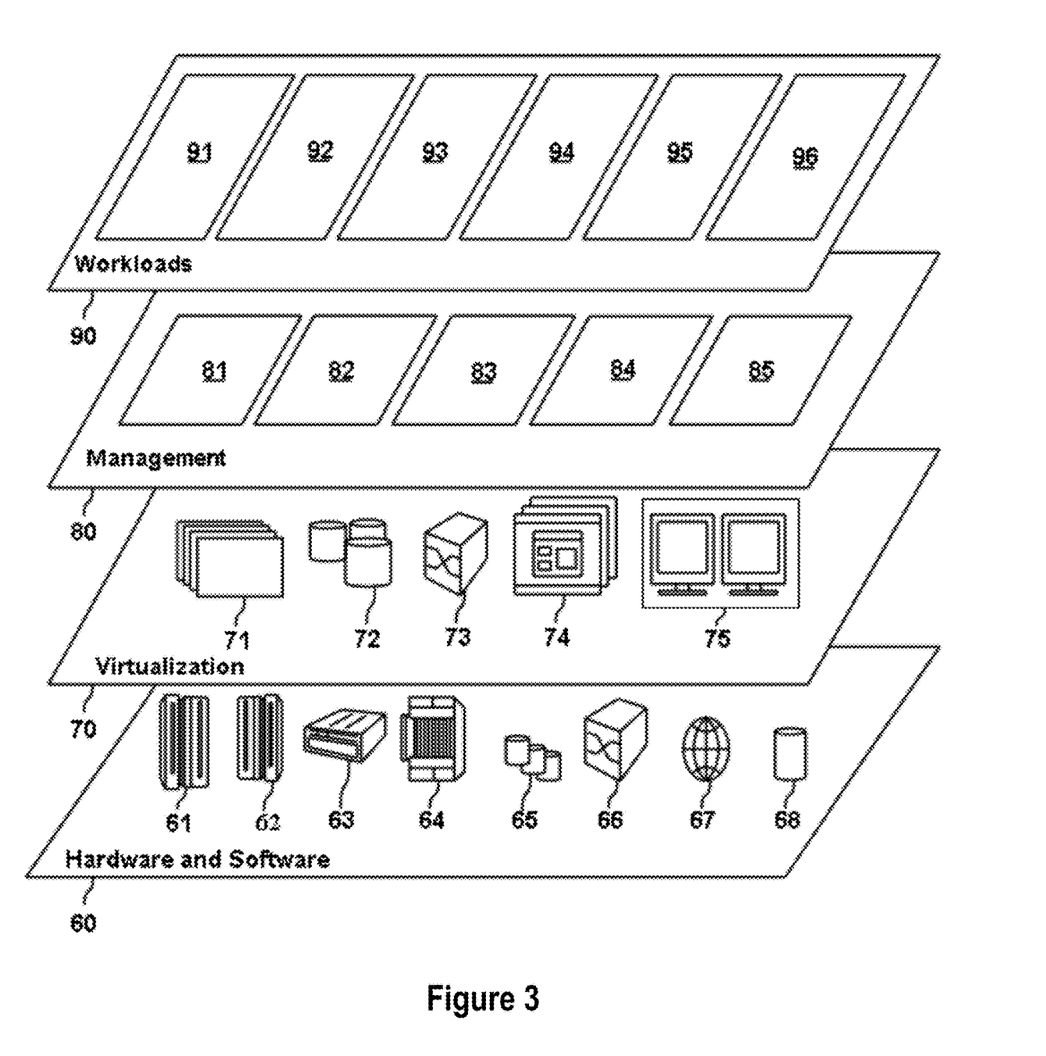
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 may include hardware and software components. Examples of hardware components may include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and failover management 96 according to embodiments of the disclosure.

With the wide adoption of batch jobs in cloud computing environments, the failover management of batch jobs becomes more and more important. For example, in disaster recovery (DR) in a cloud computing environment, a plurality of batch jobs may be scheduled for disaster recovery (DR). If an interruption occurs during the execution a certain batch job, a failover process will be triggered. After the failover, some of the batch jobs may need to re-run. Typically, there are dependencies among batch jobs. However, due to the dependencies among batch jobs, current approaches do not support a fine-grained identification of which batch jobs in a set of batch jobs, or which processing actions in a batch job, need to re-run; rather, a rollback to the beginning of the whole set of batch jobs is executed and the whole set of batch jobs is re-run, which is time and resource consuming and wasteful. Embodiments of the present disclosure provide solutions to address such problems.

Figure 4:
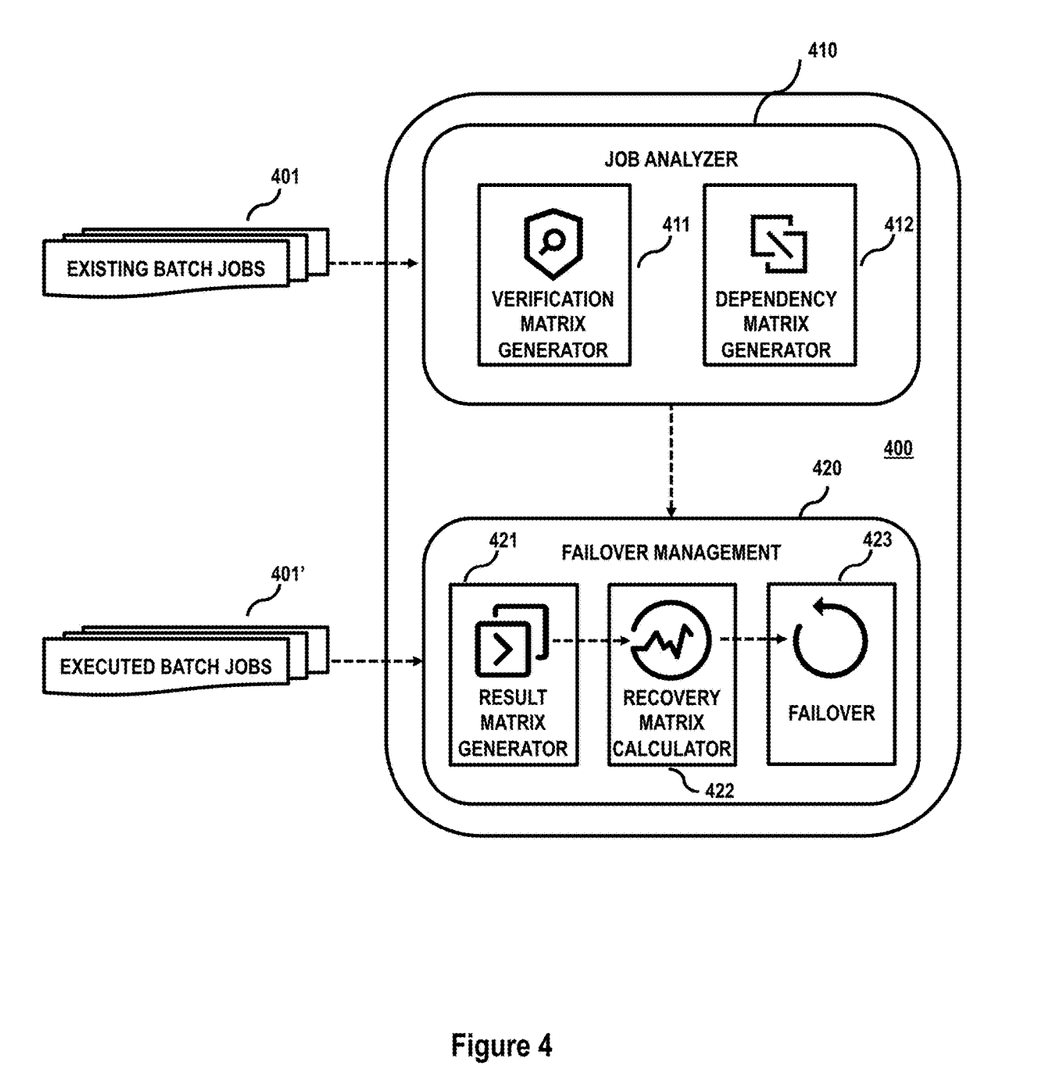
FIG. 4 depicts a block diagram of an exemplary system according to some embodiments of the present disclosure.

FIG. 4 depicts a block diagram of an exemplary system 400 according to some embodiments of the present disclosure. As shown in FIG. 4, the exemplary system 400 according to some embodiments of the present disclosure may comprise a job analyzer 410 and a failover management 420. The job analyzer 410 may be configured to analyze existing batch jobs 401 in a pre-execution phase (such as in a job queue) to obtain corresponding verification information and corresponding dependency information of respective existing batch jobs, represented in the form of matrices. Here, the term 'existing batch jobs' is used to refer to those batch jobs existing in the system. If a new batch job is added to the system, it will be added to the list of existing batch jobs.

As shown in FIG. 4, the job analyzer 410 may comprise a verification matrix generator 411, which is configured to generate a verification matrix for the existing batch jobs 401. The verification matrix may be used to indicate corresponding processing actions in each of the existing batch jobs 401. According to some embodiments of the present disclosure, the verification matrix may be normalized such that only value '0' or '1' may be associated with each of the elements in the matrix, represented as matrix V in formula (1), below, where $v_{ij}=1$ means that there is processing action j in batch job i, and where $v_{ij}=0$ means that there is no such processing action j in batch job i, where i is the column in the matrix indicating a batch job, and j is the row in the matrix indicating a processing action in a batch job.

$$V = \begin{pmatrix} 1 & \cdots & 1 \\ \vdots & \ddots & \vdots \\ 0 & \cdots & 1 \end{pmatrix} \quad (1)$$

It should be noted that the normalized verification matrix V shown in formula (1) is merely an exemplary representative form of the verification matrix, and that those skilled in the art may design the verification matrix to be represented in any other appropriate forms as long as the verification matrix indicates corresponding processing actions in each of the existing batch jobs 401. It should also be noted that the meaning of rows and columns in the verification matrix may be interchangeable and such interchangeability is applicable to other matrices in the present disclosure. Again, it should be noted that the meaning of the values 0 and 1 may be interchangeable and such interchangeability is applicable to other matrices in the present disclosure. Further, other types of representation may be used instead of the values 0 and 1 in the verification matrix.

According to some embodiments of the present disclosure, the generation of the verification matrix may be carried out by identifying each processing action in a batch job, and if a processing action is identified, the corresponding element value for the processing action in the verification matrix may be set to 1. If a processing action is not identified, the corresponding element value for the processing action in the verification matrix may be set to 0. Typically, a processing action in a batch job may, for example, contain codes to read a record from a batch data stream, perform business logic with that record, and then continue to read the next record. A processing action may be identified by simply reading its definition part, or its annotation. Various methods known in the art can be utilized to identify processing actions in a batch; for example, by simply performing a code analysis on a batch job to identify respective definition parts or annotations, corresponding processing actions in the batch job may be identified.

Also as shown in FIG. 4, the job analyzer 410 may also comprise a dependency matrix generator 412, which is configured to generate at least one dependency matrix for the existing batch jobs 401. The dependency matrix may indicate corresponding dependencies between respective processing actions in each of the existing batch jobs 401, referred to as an internal dependency matrix according to some embodiments of the present disclosure. For example, if a processing action in a batch job is dependent on another processing action in the same batch job, then there is dependency between the two processing actions of the batch job. According to some embodiments of the present disclosure, for each of the existing batch jobs, a corresponding internal dependency matrix may be generated by identifying dependencies between respective processing actions.

According to some embodiments of the present disclosure, the internal dependency matrix may be normalized such that only value '0' or '1' may be associated with each of the elements in the matrix, represented in formula (2) as matrix $ID_i$, where $id_{mn}=1$ means that there is dependency between processing action n and processing action m in batch job i, and where $id_{mn}=0$ means that there is no dependency between processing action n and processing action m in batch job i, where i indicates batch job i,m is the column in the matrix indicating a processing action in batch job i, and n is the row in the matrix indicating a processing action in the same batch job i. The number of rows of each internal dependency matrix for each batch job equals to the number of processing actions of the batch job in the plurality of jobs that is with maximum number of processing actions. This is to ensure all internal dependency matrices are with same number of rows.

$$ID_i = \begin{pmatrix} 1 & \cdots & 1 \\ \vdots & \ddots & \vdots \\ 0 & \cdots & 1 \end{pmatrix} \qquad (2)$$

Various methods known in the art (or to be developed in the future) can be utilized to identify dependencies between respective processing actions in a batch job; for example, by scanning the resources for each of the processing actions in the batch job, dependencies between any two processing actions may be identified. In another example, the metadata for the batch job may also be scanned and the resources for each metadata may be further scanned to identify dependencies between any two processing actions. Then, if a processing action is dependent upon another processing action (for example, a processing action accesses the same resources that another processing action accesses, etc.), the corresponding element value indicating the dependency between the two processing actions in the internal dependency matrix for the batch job may be set to 1. If a processing action is not dependent upon another processing action, the corresponding element value indicating the dependency between the two processing actions in the internal dependency matrix for the batch job may be set to 0. The details of how to identify dependencies between respective processing actions in a batch job is omitted for the brevity of the disclosure.

According to some embodiments of the present disclosure, the dependency matrix generator 412 may also be configured to generate a trigger dependency matrix for the existing batch jobs 401. The trigger dependency matrix may indicate corresponding dependencies between respective processing actions in each of the existing batch jobs 401 and other batch jobs in the existing batch jobs 401. For example, if a processing action in a batch job issues another batch job, then there is dependency between the processing action of the batch job and the other batch job. Such dependency may be identified as trigger dependency, i.e., the processing action of the batch job triggers another batch job.

According to some embodiments of the present disclosure, the trigger dependency matrix may be normalized such that only value '0' or '1' may be associated with each of the element in the matrix, represented in formula (3) as matrix TD, wherein $td_{ij}=1$ means that there is trigger dependency for processing action j in batch job i, and $td_{ij}=0$ means that there is no trigger dependency for processing action j in batch job i, where i is the column in the matrix indicating a batch job, and j is the row in the matrix indicating a processing action in a batch job.

$$TD = \begin{pmatrix} 1 & \cdots & 1 \\ \vdots & \ddots & \vdots \\ 0 & \cdots & 1 \end{pmatrix} \qquad (3)$$

Various methods known in the art (or to be developed in the future) can be utilized to identify trigger dependencies between respective processing actions in a batch job and other batch jobs in the existing batch jobs 401; for example, by simply performing a code analysis, such trigger dependencies may be identified. Then, if there is trigger dependency for a processing action in a batch job, the corresponding element value indicating the trigger dependency for the processing action in the batch job in the trigger dependency matrix may be set to 1. If there is no trigger dependency for a processing action in a batch job, the corresponding element value indicating the trigger dependency for the processing action in the batch job in the trigger dependency matrix may be set to 0.

Also as shown in FIG. 4, the failover management 420 may comprise a result matrix generator 421, a recovery matrix calculator 422, and a failover component 423.

The result matrix generator 421 may be configured to generate a running result matrix for the executed batch jobs 401', which corresponds to the existing batch jobs 401 executed. According to some embodiments of the present disclosure, the running result matrix may be generated based on an execution matrix of the executed batch jobs 401', and the verification matrix generated by the verification matrix generator 411. The execution matrix may indicate corresponding execution statuses for respective processing actions in the executed batch jobs 401' corresponding to the batch jobs 401.

According to some embodiments of the present disclosure, the execution matrix may be normalized such that only value '0' or '1' may be associated with each of the elements in the matrix, represented in formula (4) as matrix E, where $e_{ij}=1$ means that processing action j in batch job i has been successfully executed, where $e_{ij}=0$ means that processing action j in batch job i has not been successfully executed, where i is the column in the matrix indicating a batch job, and where j is the row in the matrix indicating a processing action in a batch job.

$$E = \begin{pmatrix} 1 & \cdots & 1 \\ \vdots & \ddots & \vdots \\ 0 & \cdots & 1 \end{pmatrix} \qquad (4)$$

Various methods known in the art (or to be developed in the future) can be utilized to identify corresponding execution statuses for respective processing actions in respective batch jobs; for example, by simply reading corresponding execution results recorded by the system, such execution statuses may be identified. Then, if the execution status for a processing action in a batch job is successful, the corresponding element value indicating the execution status for the processing action in the batch job in the execution matrix may be set to 1. If the execution status for a processing action in a batch job is unsuccessful, the corresponding element value indicating the execution status for the processing action in the batch job in the execution matrix may be set to 0.

According to some embodiments of the present disclosure, the result matrix generator 421 may generate the running result matrix by a matrix subtraction operation of the verification matrix generated by the verification matrix generator 411 and the execution matrix discussed above, as shown in formula (5), such that corresponding running results for respective processing actions in each of the executed batch jobs 401' may be determined, represented in the form of a running result matrix R, for example, as will be discussed in further detail below. The matrix subtraction operation may be represented in the formula (5) as:

$$R = V - E \quad (5)$$

According to some embodiments of the present disclosure, the running result matrix may be also normalized such that only value '0' or '1' may be associated with each of the element in the matrix, represented in formula (6) as matrix R, wherein $r_{ij}=1$ means that processing action j in batch job i has not been successfully executed, and $r_{ij}=0$ means that processing action j in batch job i has been successfully executed or there is no such processing action j in batch job i, where i is the column in the matrix indicating a batch job, and j is the row in the matrix indicating a processing action in a batch job. Thus, those processing actions which have not been successfully executed in the plurality of batch jobs may be identified in the result matrix.

$$R = \begin{pmatrix} 1 & \cdots & 1 \\ \vdots & \ddots & \vdots \\ 0 & \cdots & 1 \end{pmatrix} \quad (6)$$

According to some embodiments of the present disclosure, the recovery matrix calculator 422 may be configured to calculate a recovery matrix for executed batch jobs 401'. The recovery matrix may indicate corresponding recovery actions for respective processing actions in each of the existing batch jobs 401, i.e., whether a processing action in a batch job needs to re-run. The recovery matrix may comprise an internal recovery matrix and an external recovery matrix.

According to some embodiments of the present disclosure, the internal recovery matrix is calculated so that respective processing actions in each of the existing batch jobs 401 with internal dependencies associated, which are not executed successfully, may be identified, and corresponding failover management may be executed based on the internal recovery matrix. According to some embodiments of the present disclosure, the external recovery matrix is calculated so that respective processing actions in each of the existing batch jobs 401 that are with trigger dependencies associated may be further identified, and corresponding failover management may be further executed based on the external recovery matrix.

According to some embodiments of the present disclosure, the recovery matrix calculator 422 may calculate the internal recovery matrix by identifying respective processing actions in each of the existing batch jobs 401 that are not executed successfully and with internal dependencies associated. This identification may be simply done by applying a matrix multiplication operation of the internal dependency matrix $ID_i$ and the running result matrix $R[:,i]$ for batch job i, shown in formula (7) as matrix RA, where i indicates batch job i, $ID_i[:,:]$ indicates the internal dependency matrix for batch job i, $R[:,i]$ for batch job i indicates the column i in the running result matrix R, symbol "*" indicates matrix multiplication operation between two matrices, and symbol 'sgn' indicates a normalization of the RA. For each processing action in a batch job i (which corresponds to each row of the internal dependency matrix $ID_i$ or each row of the column i of the running result matrix R), each element in a row of the internal dependency matrix $ID_i$ is multiplied by corresponding element in the column i of the running result matrix R, and then summed. The summed result is then normalized. The normalized summed result for the row will be used as the value of the corresponding row of the column i in the internal recovery matrix RA, wherein $RA_{ij}=1$ indicates that processing action j in batch job i needs to re-run, where $RA_{ij}=0$ indicates that processing action j in batch job i does not need to re-run, where i is the column in the matrix indicating a batch job, and where j is the row in the matrix indicating a processing action in a batch job. Based on the internal recovery matrix in formula (7), corresponding failover management may be executed.

$$RA = \{sg\ n(ID_i[:,:]*R[:,i])\}0<i\leq\text{the number of batch jobs} \quad (7)$$

According to some embodiments of the present disclosure, the recovery matrix calculator 422 may further calculate the external recovery matrix by identifying respective processing actions in each of the existing batch jobs 401 that are with trigger dependencies associated. This identification may be simply done by a logic OR operation of the calculated internal recovery matrix in formula (7) (i.e., the matrix RA) and the trigger dependency matrix TD as matrix A shown in formula (8), wherein symbol '||' indicates the logic OR operation of matrices TD and RA.

$$A = TD\|RA \quad (8)$$

According to some embodiments of the present disclosure, the external recovery matrix A may be normalized such that only value '0' or '1' may be associated with each of the element in the matrix, shown in formula (9) as matrix A, where $A_{ij}=1$ means that processing action j in batch job i needs to re-run, where $A_{ij}=0$ means that processing action j in batch job i does not need to re-run, where i is the column in the matrix indicating a batch job, and where j is the row in the matrix indicating a processing action in a batch job.

$$A = \begin{pmatrix} 1 & \cdots & 1 \\ \vdots & \ddots & \vdots \\ 0 & \cdots & 1 \end{pmatrix} \quad (9)$$

According to some embodiments of the present disclosure, the external recovery matrix A may then be further fed to the failover component 423 of the failover management 420, where corresponding processing actions identified in the recovery matrix may be instructed to re-run.

Embodiments of the present disclosure will be described in the following with three batch jobs as an example. It should be noted that the description is merely for the purpose of simplified illustration and should not adversely limit the scope of the disclose.

For example, there are three batch jobs, BJ1{S11, S12, S13}, BJ2{S21, S22} and BJ3{S31, S32}, in which S11, S12, S13, S21, S22, S31, S32 represent processing actions. There is dependency between processing actions S11 and S13 for batch job BJ1. There are no internal dependencies for either BJ2 or BJ3. There is also dependency between S12 of BJ1 and BJ2. According to some embodiments of the present invention, the verification matrix, the internal dependency matrices, the trigger dependency matrix may be generated shown in formulas (10-13), respectively.

$$V = \begin{pmatrix} 1 & 1 & 1 \\ 1 & 1 & 1 \\ 1 & 0 & 0 \end{pmatrix} \quad (10)$$

$$ID_1 = \begin{pmatrix} 1 & 0 & 1 \\ 0 & 1 & 0 \\ 1 & 0 & 1 \end{pmatrix} \quad (11)$$

$$ID_2 = ID_3 = \begin{pmatrix} 1 & 0 & 0 \\ 0 & 1 & 0 \\ 0 & 0 & 0 \end{pmatrix} \quad (12)$$

$$TD = \begin{pmatrix} 0 & 0 & 0 \\ 1 & 0 & 0 \\ 0 & 0 & 0 \end{pmatrix} \quad (13)$$

After the three batch jobs have been executed respectively, an execution matrix may be obtained, as shown in formula (14).

$$E = \begin{pmatrix} 1 & 1 & 0 \\ 1 & 0 & 1 \\ 0 & 0 & 0 \end{pmatrix} \quad (14)$$

The running result matrix R may be calculated by matrix subtraction operation of R=V−E, the result of which is shown in formula (15).

$$R = \begin{pmatrix} 0 & 0 & 1 \\ 0 & 1 & 0 \\ 1 & 0 & 0 \end{pmatrix} \quad (15)$$

The internal dependency matrices $ID_i$ may be applied by a matrix multiplication operation to the column i in R, where the resulting internal recovery matrix is shown in formula (16).

$$RA = \begin{pmatrix} 1 & 0 & 1 \\ 0 & 1 & 0 \\ 1 & 0 & 0 \end{pmatrix} \quad (16)$$

According to some embodiments of the present disclosure, failover management may be executed by re-running processing action S11 and S13 in BJ1, S22 in BJ2 and S31 in BJ3.

In addition, the trigger dependency TD may be applied by a logic OR operation to RA, where the resulting external recovery matrix is shown in formula (17).

$$A = \begin{pmatrix} 1 & 0 & 1 \\ 1 & 1 & 0 \\ 1 & 0 & 0 \end{pmatrix} \quad (17)$$

According to some embodiments of the present disclosure, failover management may be executed by re-running processing action S11, S12 and S13 in BJ1, S22 in BJ2 and S31 in BJ3.

Figure 5:
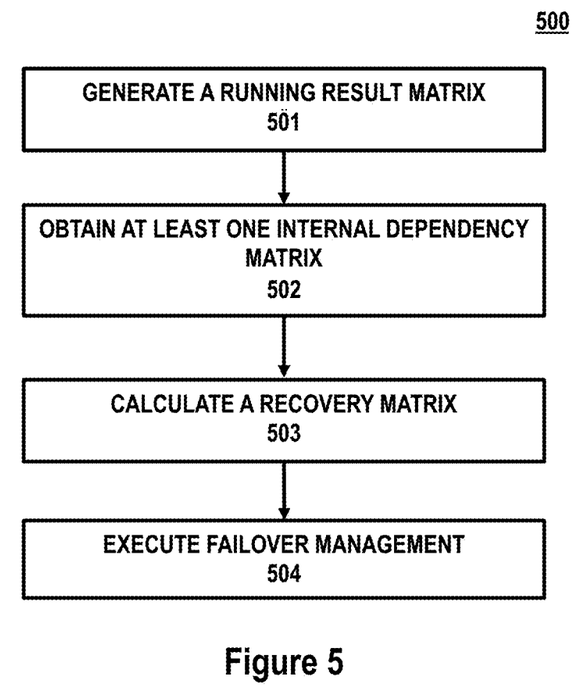
FIG. 5 depicts a flowchart of an exemplary method according to some embodiments of the present disclosure.

FIG. 5 depicts a flowchart of an exemplary method 500 according to some embodiments of the present disclosure. The exemplary method 500 comprises, at operation 501, generating a running result matrix for a plurality of batch jobs (e.g., the existing batch jobs 401 in FIG. 4), the running result matrix indicating corresponding running results for respective processing actions in each of the plurality of batch jobs. The running result matrix may be generated, for example, by the result matrix generator 421 in FIG. 4.

At operation 502, at least one internal dependency matrix for the plurality of batch jobs may be obtained, the at least one dependency matrix indicating corresponding dependencies between respective processing actions in each of the plurality of batch jobs, e.g., matrix ID as discussed in the above. According to some embodiments of the present disclosure, the at least one internal dependency matrix may be obtained from, for example, the dependency matrix generator 412 in FIG. 4, which generates the at least one internal dependency matrix in a pre-execution phase. According to some embodiments of the present disclosure, a corresponding internal dependency matrix may be generated for each of the batch jobs in the plurality of batch jobs.

At operation 503, a recovery matrix for the plurality of batch jobs may be calculated based on the generated running result matrix and the obtained at least one internal dependency matrix, the recovery matrix indicating corresponding recovery actions for respective processing actions in each of the plurality of batch jobs. The recovery matrix may be calculated, for example, by the recovery matrix calculator 422 in FIG. 4.

At operation 504, failover management may be executed based on the calculated recovery matrix, for example, by the failover component 423 in FIG. 4.

According to some embodiments of the present disclosure, the recovery matrix may comprise an internal recovery matrix, where the internal recovery matrix may be calculated based on the generated running result matrix and the obtained at least one internal dependency matrix.

According to some embodiments of the present disclosure, the recovery matrix may comprise an external recovery matrix, where the external recovery matrix may be calculated by obtaining a trigger dependency matrix for the plurality of batch jobs and calculating the external recovery matrix based on the obtained trigger dependency matrix and the internal recovery matrix, the trigger dependency matrix indicating corresponding dependencies between respective processing actions in each of the plurality of batch jobs and other batch jobs in the plurality of batch jobs, e.g., matrix TD as discussed above. According to some embodiments of the present disclosure, the trigger dependency matrix may be obtained from, for example, the dependency matrix generator 412 in FIG. 4, which generates the trigger dependency matrix in a pre-execution phase. According to some embodiments of the present disclosure, the trigger dependency matrix may be generated in a pre-execution phase; for example, by the dependency matrix generator 412 in FIG. 4.

According to some embodiments of the present disclosure, the executing failover management based on the calculated recovery matrix for the plurality of batch jobs comprises recovering at least one processing action based on the calculated recovery matrix. The recovery of the at least one processing action may be executed, for example, by the failover component 423 in FIG. 4.

According to some embodiments of the present disclosure, the generation of the running result matrix is executed responsive to a failover during runtime.

Figure 6:
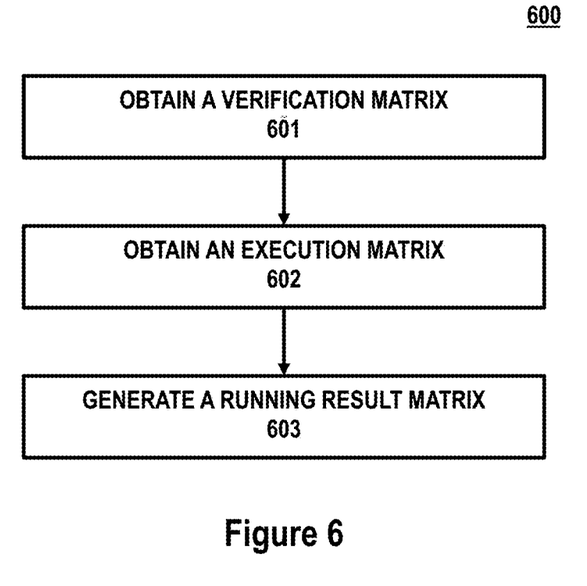
FIG. 6 depicts a flowchart of an exemplary method according to some embodiments of the present disclosure.

FIG. 6 depicts a flowchart of an exemplary method 600 according to some embodiments of the present disclosure. The exemplary method 600 comprises, at operation 601, obtaining a verification matrix (e.g., matrix V as discussed above) for the plurality of batch jobs from, for example, the verification matrix generator 411 in FIG. 4. The verification matrix may indicate corresponding processing actions in each of the plurality of batch jobs (e.g., the existing batch jobs 401 in FIG. 4).

At operation 602, an execution matrix for the plurality of batch jobs (e.g., matrix E as discussed above) may be obtained from, for example, the executed batch jobs 401' in FIG. 4. The executed batch jobs 401' correspond to the execution results of the existing batch jobs 401.

At operation 603, a running result matrix (e.g., matrix R as discussed in the above) may be generated for the plurality of batch jobs, for example, by the result matrix generator 421 in FIG. 4. According to some embodiments of the present disclosure, the generation of the running result matrix may be executed by a subtraction operation of the verification matrix and the execution matrix.

Figure 7:
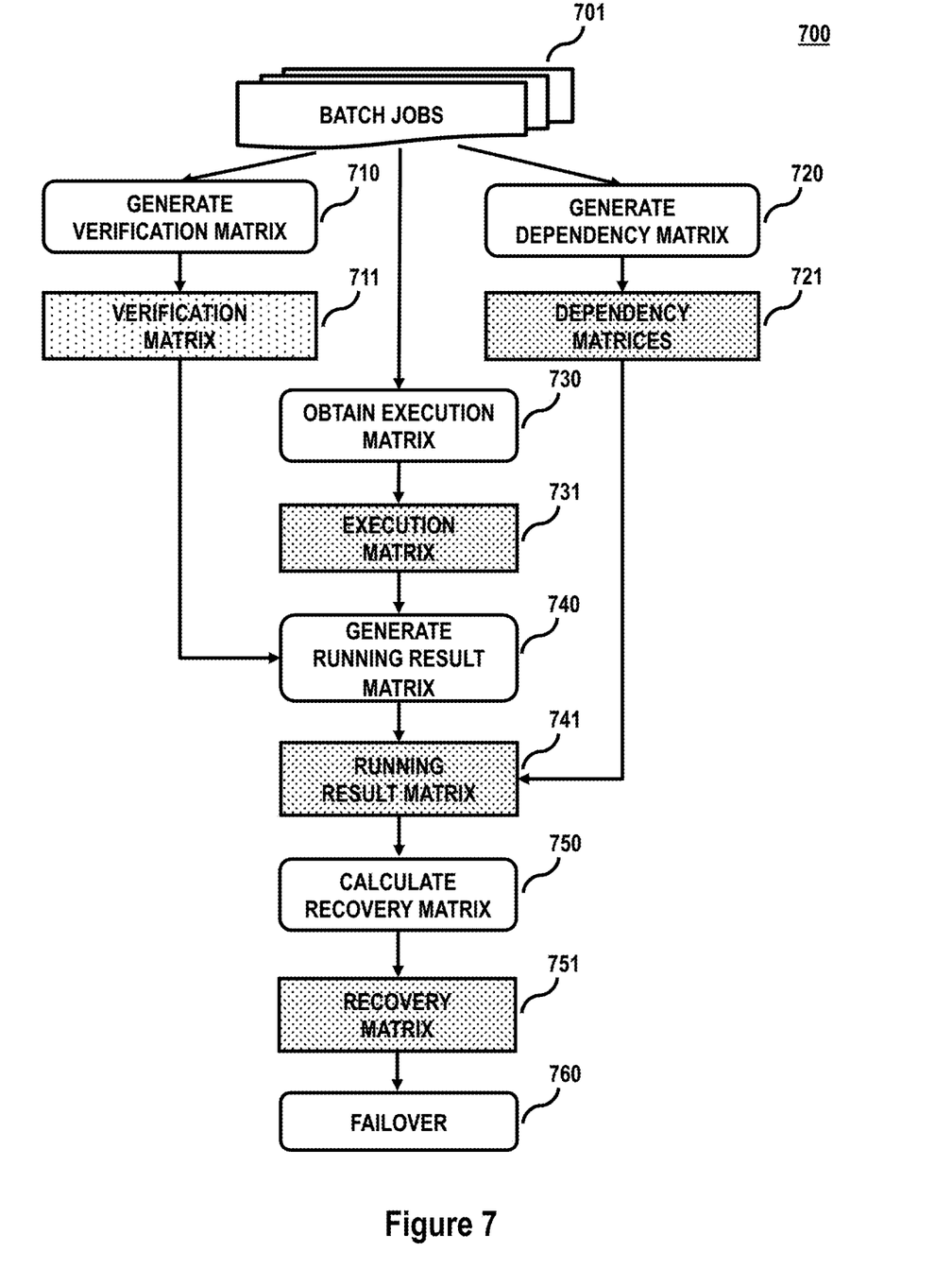
FIG. 7 depicts an exemplary workflow according to some embodiments of the present disclosure.

FIG. 7 depicts an exemplary workflow 700 according to some embodiments of the present disclosure. The blocks with no shadow indicate actions executed, and the blocks with shadows indicate corresponding execution results of respective actions. In the following, a general description of the workflow 700 will be discussed, while details of each action and each result may refer back the discussions in the above with reference to FIG. 4.

The workflow 700 starts from 701 where a plurality of batch jobs are analyzed to generate at 710 corresponding verification matrix 711, and to generate at 720 corresponding dependency matrices 721. Responsive to a failover during runtime, an execution matrix 731 may be obtained at 730 from the execution of the plurality of batch jobs and a running result matrix 741 may then be generated at 740 based on the verification matrix 711 and the execution matrix 731. Then dependency matrices 721 are applied to the running result matrix 741 to calculate at 750 a recovery matrix 751 with which a failover process may be triggered at 760 in which corresponding processing actions in the plurality of batch jobs indicated in the recovery matrix 751 may be instructed to re-run.

Embodiments of the presented disclosure use matrix operations to support fine-grained identification of which batch job in a set of batch jobs, and which processing action in a batch job, need to re-run; in the meantime, dependencies among batch jobs are fully considered. Matrix operations are fast and effective, thus problems discussed in the present disclosure are addressed.

Embodiments of the present disclosure have been described in the above. It should be noted that the failover management according to embodiments of this disclosure could be implemented by computer system/server 12 of FIG. 1.

Embodiments of the present disclosure may be a system, a method, and/or a computer program product at any possible technical detail level of integration. The computer program product may include a computer readable storage medium (or media) having computer readable program instructions thereon for causing a processor to carry out aspects of embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present disclosure.

Aspects of embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   generating, by one or more processors, a running result matrix for a plurality of batch jobs, the running result matrix indicating corresponding running results for respective processing actions in batch jobs of the plurality of batch jobs;
   obtaining, by one or more processors, an internal dependency matrix for the plurality of batch jobs, the internal dependency matrix indicating corresponding dependencies between respective processing actions within a batch job of the plurality of batch jobs;
   calculating, by one or more processors, an internal recovery matrix based, at least in part, on the running result matrix and the internal dependency matrix;
   obtaining, by one or more processors, a trigger dependency matrix for the plurality of batch lobs, the trigger dependency matrix indicating corresponding dependencies between respective processing actions in batch jobs of the plurality of batch jobs and other batch jobs in the plurality of batch jobs;
   calculating, by one or more processors, an external recovery matrix for the plurality of batch jobs based, at least in part, on the internal recovery matrix and the trigger dependency matrix, the external recovery matrix indicating corresponding recovery actions for respective processing actions in batch jobs of the plurality of batch jobs; and
   executing, by one or more processors, failover management for one or more batch jobs of the plurality of batch jobs based, at least in part, on the calculated external recovery matrix, wherein failover management re-runs one or more processing actions according to the calculated external recovery matrix.

2. The computer-implemented method of claim 1, wherein the internal dependency matrix and the trigger dependency matrix are generated by analyzing the plurality of batch jobs in a pre-execution phase.

3. The computer-implemented method of claim 1, wherein the generating of the running result matrix includes:
   obtaining a verification matrix for the plurality of batch jobs, the verification matrix indicating corresponding processing actions in batch jobs of the plurality of batch jobs; obtaining an execution matrix for the plurality of batch jobs, the execution matrix indicating corresponding execution statuses for respective processing actions in batch jobs of the plurality of batch jobs; and
   generating the running result matrix by performing a subtraction operation involving the verification matrix and the execution matrix.

4. The computer-implemented method of claim 3, wherein the verification matrix and the internal dependency matrix are generated by analyzing the plurality of batch jobs in a pre-execution phase, and wherein the execution matrix is obtained in a runtime phase.

5. The computer-implemented method of claim 1, wherein the executing of failover management for one or more batch jobs of the plurality of batch jobs includes recovering at least one processing action based, at least in part, on the calculated external recovery matrix.

6. A computer program product comprising one or more non-transitory computer readable storage media and program instructions collectively stored on the one or more non-transitory computer readable storage media, the program instructions executable by one or more processors to cause the one or more processors to perform a method comprising:
   generating a running result matrix for a plurality of batch jobs, the running result matrix indicating corresponding running results for respective processing actions in batch jobs of the plurality of batch jobs;
   obtaining an internal dependency matrix for the plurality of batch jobs, the internal dependency matrix indicating corresponding dependencies between respective processing actions within a batch job of the plurality of batch jobs;

calculating an internal recovery matrix based, at least in part, on the running result matrix and the internal dependency matrix;

obtaining a trigger dependency matrix for the plurality of batch lobs, the trigger dependency matrix indicating corresponding dependencies between respective processing actions in batch jobs of the plurality of batch jobs and other batch jobs in the plurality of batch jobs;

calculating an external recovery matrix for the plurality of batch jobs based, at least in part, on the internal recovery matrix and the trigger dependency matrix, the external recovery matrix indicating corresponding recovery actions for respective processing actions in batch jobs of the plurality of batch jobs; and executing failover management for one or more batch jobs of the plurality of batch jobs based, at least in part, on the calculated external recovery matrix, wherein failover management re-runs one or more processing actions according to the calculated external recovery matrix.

7. The computer program product of claim 6, wherein the internal dependency matrix and the trigger dependency matrix are generated by analyzing the plurality of batch jobs in a pre-execution phase.

8. The computer program product of claim 6, wherein the generating of the running result matrix includes:
   obtaining a verification matrix for the plurality of batch jobs, the verification matrix indicating corresponding processing actions in batch jobs of the plurality of batch jobs;
   obtaining an execution matrix for the plurality of batch jobs, the execution matrix indicating corresponding execution statuses for respective processing actions in batch jobs of the plurality of batch jobs; and
   generating the running result matrix by performing a subtraction operation involving the verification matrix and the execution matrix.

9. The computer program product of claim 8, wherein the verification matrix and the internal dependency matrix are generated by analyzing the plurality of batch jobs in a pre-execution phase, and wherein the execution matrix is obtained in a runtime phase.

10. The computer program product of claim 6, wherein the executing of failover management for one or more batch jobs of the plurality of batch jobs includes recovering at least one processing action based, at least in part, on the calculated external recovery matrix.

11. A computer system comprising: one or more processors; and
   one or more computer readable storage media; wherein:
      the one or more processors are structured, located, connected and/or programmed to execute program instructions collectively stored on the one or more computer readable storage media; and the program instructions, when executed by the one or more processors, cause the one or more processors to perform a method comprising:

generating a running result matrix for a plurality of batch jobs, the running result matrix indicating corresponding running results for respective processing actions in batch jobs of the plurality of batch jobs;

obtaining an internal dependency matrix for the plurality of batch jobs, the internal dependency matrix indicating corresponding dependencies between respective processing actions within a batch job of the plurality of batch jobs;

calculating an internal recovery matrix based, at least in part, on the running result matrix and the internal dependency matrix;

obtaining a trigger dependency matrix for the plurality of batch lobs, the trigger dependency matrix indicating corresponding dependencies between respective processing actions in batch jobs of the plurality of batch jobs and other batch jobs in the plurality of batch jobs;

calculating an external recovery matrix for the plurality of batch jobs based, at least in part, on the internal recovery matrix and the trigger dependency matrix, the external recovery matrix indicating corresponding recovery actions for respective processing actions in batch jobs of the plurality of batch jobs; and executing failover management for one or more batch jobs of the plurality of batch jobs based, at least in part, on the calculated external recovery matrix, wherein failover management re-runs one or more processing actions according to the calculated external recovery matrix.

12. The computer system of claim 11, wherein the internal dependency matrix and the trigger dependency matrix are generated by analyzing the plurality of batch jobs in a pre-execution phase.

13. The computer system of claim 11, wherein the generating of the running result matrix includes:
   obtaining a verification matrix for the plurality of batch jobs, the verification matrix indicating corresponding processing actions in batch jobs of the plurality of batch jobs;
   obtaining an execution matrix for the plurality of batch jobs, the execution matrix indicating corresponding execution statuses for respective processing actions in batch jobs of the plurality of batch jobs; and
   generating the running result matrix by performing a subtraction operation involving the verification matrix and the execution matrix.

14. The computer system of claim 13, wherein the verification matrix and the internal dependency matrix are generated by analyzing the plurality of batch jobs in a pre-execution phase, and wherein the execution matrix is obtained in a runtime phase.

15. The computer system of claim 11, wherein the executing of failover management for one or more batch jobs of the plurality of batch jobs includes recovering at least one processing action based, at least in part, on the calculated external recovery matrix.

* * * * *